United States Patent [19]
Hinkle

[11] Patent Number: 5,515,711
[45] Date of Patent: May 14, 1996

[54] PRESSURE MEASUREMENT AND CALIBRATION APPARATUS USING GRAVITY-INDUCED DIAPHRAGM DEFLECTION

[75] Inventor: Luke D. Hinkle, Townsend, Mass.

[73] Assignee: MKS Instruments, Inc., Andover, Mass.

[21] Appl. No.: 494,965

[22] Filed: Jun. 26, 1995

[51] Int. Cl.$^6$ ................................................. G01L 27/00
[52] U.S. Cl. ........................... 73/4 V; 73/4 R; 73/701
[58] Field of Search ............................ 73/4 R, 4 V, 701, 73/718, 724, 745, 711

[56] References Cited

U.S. PATENT DOCUMENTS

| | | |
|---|---|---|
| 3,688,554 | 9/1972 | Kipnis et al. . |
| 4,785,669 | 11/1988 | Benson et al. . |
| 5,155,653 | 10/1992 | Kremidas . |
| 5,207,767 | 5/1993 | Delatorre . |
| 5,353,753 | 9/1994 | Boutin ............................ 73/701 |
| 5,388,462 | 2/1995 | Delatorre . |
| 5,396,803 | 3/1995 | Ferran . |

OTHER PUBLICATIONS

Charles R. Tilford, New Directions in Vacuum Measurements at NIST, *1992 NCSL Workshop & Symposium*, pp. 583–592.

Jousten et al., "The Uncertainties of Calibration Pressures at PTB", *Vacuum*, vol. 44/Nos. 5–7/pp. 569 to 572/1993.

Straub et al., "Use of Capacitance Diaphragm Gauges at Pressures Down to $10^{-06}$", *Rev. Sci. Instrum.* 65 (10), Oct. 1994.

Calcatelli et al., "Primary and Secondary Vacuum Measurements", *Vacuum*/vol. 44/Nos. 5–7/pp. 573 to 576/1993.

*Primary Examiner*—Brian Zimmerman
*Assistant Examiner*—Joseph L. Felber
*Attorney, Agent, or Firm*—Lappin & Kusmer

[57] ABSTRACT

A pressure measurement and calibration apparatus for accurately detecting fluid pressures in the range of between approximately 0 and 1000 millitorr, and more particularly in the range of between 0 and 10 millitorr, and a method for calibrating an external pressure measuring device using the apparatus. The apparatus employs a pressure sensing assembly having a deflectable diaphragm and sensing electrodes. The assembly is rotated about an axis which is normal to the direction of local gravitational acceleration through preselected angles relative to the direction of local gravitational acceleration. The apparatus generates an output signal representative of the deflection of the diaphragm due to gravitational acceleration on the diaphragm at a given angular orientation. The apparatus then controllably conducts a fluid flow against the diaphragm at a sufficient pressure to substantially eliminate the deflection attributable to gravity on the diaphragm. The magnitude of the fluid pressure required to restore the diaphragm to its non-deflected state can then be computed with accuracy that is traceable to known primary standards.

16 Claims, 3 Drawing Sheets

PRESSURE MEASUREMENT AND CALIBRATION APPARATUS USING GRAVITY-INDUCED DIAPHRAGM DEFLECTION

FIELD OF THE INVENTION

This invention relates to apparatus for measuring fluid pressures in the range of 0–1000 millitorr, and more particularly to apparatus for measuring gas pressures in the range of approximately 0–10 millitorr.

BACKGROUND OF THE INVENTION

There is a need for apparatus for measurement and calibration of fluid pressures of less than 1000 millitorr, and especially in the range of approximately 0–10 millitorr. There is also a need for a primary pressure standard for fluid pressures in this pressure range. The term "zero millitorr", as used herein, means a pressure of less than approximately $10^{-6}$ torr.

Devices for fluid pressure measurement at relatively low pressures are known. For example, dead-weight testers generate a pressure differential above and below a piston of variable weight and can be paired to generate relatively small differential pressures. Liquid manometers indicate pressure differences as a difference in height of a liquid in a tube or column based on the density and vapor pressure of the liquid. Volume expansion devices indicate pressure differences by controlling the expansion of a compressible fluid held at a known high pressure.

None of these devices is well suited for measuring fluid pressures in the range of 0–10 millitorr or of providing a primary pressure standard for that range of fluid pressures. The accuracy with which pressure can be measured is severely limited below 100 millitorr. Further, these devices typically measure only differential pressures, not absolute pressures. With respect to the use of liquid manometers, the properties of the liquids used, such as density and vapor pressure, vary with temperature and thus can yield unreliable measurements. It is also very difficult to measure the height of a liquid column with sufficient precision at pressures of less than about 100 millitorr Moreover, volume measurements of an expanding fluid can be difficult to make if the volumes are too small. With regard to both liquid manometers and volume expansion devices, the phenomenon of molecular adsorption of fluid on the walls of the fluid container or chamber can have a significant effect at pressures of less than 1 Torr. Contamination of the fluid is another difficulty which significantly affects pressure measurements in this range. Finally, the measurement uncertainties using these devices are relatively great, and thus the utility of such devices is limited, because they cannot provide accurate and reliable measurements in this pressure range.

OBJECTS OF THE INVENTION

It is therefore an object of the invention to provide a pressure measurement apparatus for gas pressures in the range of approximately 0–1000 millitorr.

It is another object of the invention to provide a primary pressure standard for the calibration of gas pressures in the range of approximately 0–1000 millitorr.

Another object of the invention is to provide a pressure measurement and calibration apparatus which can be used to determine gas pressures in the range of approximately 0–1000 millitorr and to generate known pressures for calibrating other pressure measurement instruments.

Another object of the invention is to provide a gas pressure measurement apparatus which can measure both differential and absolute pressures.

Still another object of the invention is to provide a pressure measurement apparatus which measures gas pressures in the range of 0–1000 millitorr with an uncertainty of no more than approximately 0.1%.

Yet another object of the invention is to provide a pressure measurement apparatus which does not expose the gas so as to minimize any contamination of the gas.

And still another object of the invention is to provide a pressure measurement apparatus which is relatively simple to automate.

And yet another object of the invention is to provide a method of measuring and calibrating gas pressures in the range of approximately 0–1000 millitorr.

SUMMARY OF THE INVENTION

The present invention is based on the principle that a gravitational force on a deflectable membrane or diaphragm exerts a pressure which can be determined with sufficient accuracy, repeatability, and traceability to primary reference standards to yield pressure values which are themselves sufficiently accurate to be used as primary standards. The term "diaphragm", as used herein, means a membrane, disk, partition or any other device which is flexible or otherwise capable of deflection in response to local gravitational forces on its principal area, or face.

In order to construct a useful pressure standard, it is necessary to identify all factors which affect the uncertainty of a pressure which is measured and to minimize the effects of those factors on the measured values to provide a measured value which is within a desired uncertainty range or tolerance. Such factors include first-order factors, such as the measured parameters (i.e., the face area density $\sigma$ of the diaphragm, the force due to gravitational acceleration g, and the angle $\theta$ of the diaphragm relative to the direction of local gravitational acceleration) and various second-order factors, such as noise induced by vibration, pressure controllability, temperature gradients, and instability of the output signals. It is also necessary to trace the measured parameters to known primary standards, such as those of the National Institute of Standards and Technology (NIST).

The pressure exerted on a diaphragm by gravity is proportional to the local acceleration due to gravity and is expressed as $P=\sigma g \sin\theta$. In this equation, $\sigma$ is the face area density of the diaphragm material (typically a foil), g is the local gravitational acceleration of an object, and $\theta$ is the angle between the plane of the diaphragm and the direction of the local gravitational acceleration. In the apparatus of the present invention, the diaphragm is initially "zeroed" by orienting it in a reference plane which is preferably substantially parallel to the direction of local gravitational force, i.e. vertical, and recording a signal representative of the deflection of the diaphragm due to gravitational force or lack of gravitational force on it. A change in the angular orientation of the diaphragm with respect to the direction of local gravitational acceleration changes the gravitational pressure exerted on the diaphragm by an amount which is proportional to the sine of the angle between the diaphragm and the direction of local gravitational acceleration. Deflection of the diaphragm as a result of gravity is indicated by a signal which is generated by a sensing electrode assembly associated with the diaphragm. Restoration of the deflection signal to zero by a fluid trained against the diaphragm in a direction opposing the deflection establishes a pressure $P_x$ which can be determined highly accurately from the above equation.

In accordance with one aspect of the present invention, the above and other objects of the invention are achieved by a pressure measurement and calibration apparatus which comprises a pressure sensing assembly, which includes a deflectable diaphragm and means for detecting the deflection of the diaphragm and for generating an output signal which is representative of the deflection. The apparatus further includes means for controllably rotating the diaphragm about a reference axis which is normal to the direction of local gravitational acceleration so that the diaphragm is capable of deflection in response to the local gravitational acceleration on it, the deflection being variable as a function of the angle between the plane of the diaphragm and the direction of local gravitational acceleration. The diaphragm, which is deflectable in response to gravitational acceleration, is rotated about the reference axis to preselected angular positions and exhibits a deflection which is proportional to the sine of the angle between the diaphragm and the direction of local gravitational acceleration. The apparatus further includes an element for controllably conducting a fluid flow against the diaphragm in a direction which opposes the direction of deflection to substantially eliminate the gravity-induced deflection of the diaphragm. Given the face area density of the diaphragm, the local gravitational acceleration, and the angle of the diaphragm relative to the direction of the local gravitational acceleration, each of which can be highly accurately measured with traceability to primary reference standards, the fluid flow pressure $P_x$ which is required to eliminate the deflection of the diaphragm at any angular position can be computed from the above equation. The pressures thus determined are themselves traceable to primary standards and are believed to be more accurate than any pressure standards which are currently in use for the pressure range of 1–1000 millitorr.

In one aspect of the invention, the pressure sensing assembly comprises a standard capacitance manometer. In what is believed to be a novel aspect of the invention, the capacitance manometer is not used in its conventional sense as a pressure measurement device. In this invention its sole function is to hold a deflectable diaphragm and to generate a signal which is proportional to the deflection of the diaphragm. Its accuracy as a pressure sensor per se is thus not critical to the accuracy of the apparatus. This aspect of the invention will be discussed more fully below in conjunction with the detailed description of the drawings.

In one embodiment of the invention, the diaphragm comprises a metal foil. In an alternative embodiment, the diaphragm comprises a solid piston coupled with an elastic spring element. Both diaphragm embodiments are capable of deflection in response to gravitational forces.

In another aspect of the invention, the fluid flow conducting element comprises a fluid source coupled to a distribution manifold. In a preferred embodiment, an isobaric coupling element couples the distribution manifold with at least one external device under test, or DUT, in fluid connection such that the diaphragm and the DUT are at equal fluid pressures, thereby permitting calibration of the DUT.

In another aspect, the rotating element comprises a rotary device which is capable of rotating the diaphragm through at least 90 degrees of incremental rotation about the reference axis. In a preferred embodiment the rotary device is a rotary table which is driven by a motor, preferably a stepper motor.

According to another aspect of the present invention, a method of calibrating an external pressure measuring device in the range of pressures between approximately 0 and 10 millitorr is provided. Using a pressure measurement apparatus as described above, the diaphragm is first oriented in a reference plane, preferably a vertical plane. A reference output signal is established which represents the deflection of the diaphragm in its reference orientation due to gravitational acceleration. The diaphragm is then rotated incrementally through a preselected angle about an axis which is normal to the direction of gravitational acceleration on the diaphragm to a first angular orientation relative to the reference plane to cause a corresponding gravity-induced deflection of the diaphragm in its new angular orientation. The new deflection of the diaphragm due to gravity at the first angle is then detected, and an output signal representative of that deflection is generated. A fluid flow is then controllably conducted against the diaphragm in a direction opposite to that of the deflection to substantially eliminate the deflection, as indicated by a return of the output signal to its reference value. When the signal is restored to its reference value, the deflection is considered to be eliminated. The magnitude of the pressure of the fluid flow against the diaphragm in the first angular position can then be determined from the above equation.

The diaphragm can then be rotated to a second angle relative to the reference plane to cause a corresponding gravity-induced deflection of the diaphragm at the second angular position. The steps of conducting a fluid flow against the diaphragm to substantially eliminate the deflection, and determining the magnitude of the fluid pressure required to do so, are repeated. The method can be performed at any number of angular positions of the diaphragm at angular increments through at least 90 degrees relative to the reference plane.

In a preferred embodiment, the reference plane is a substantially vertical plane which is parallel to the direction of local gravitational acceleration. In this embodiment, the reference signal $S_0$ corresponds to a diaphragm position which experiences essentially no deflection due to gravity. The deflection of the diaphragm varies as a function of the angle of the diaphragm relative to the direction of gravitational force.

In an alternative embodiment, the reference plane is a substantially horizontal plane which is normal to the direction of local gravitational acceleration. In this latter embodiment, the reference signal $S_0$ corresponds to a diaphragm position which experiences maximum deflection.

Regardless of the reference plane chosen, the reference signal $S_0$ corresponding to the diaphragm position in that reference plane is designated as a "zero" reading. Different signals corresponding to different angular diaphragm positions can be easily distinguished from this "zero" reading to indicate different deflections of, and thus a varying proportion of the gravitational acceleration on, the diaphragm. Restoration of any of those different signals to the "zero" reading signal $S_0$ indicates a restoration of the diaphragm to its "zero", or reference, orientation.

Calibration can be achieved over a greater range of pressures, if desired, by maintaining the pressure $P_x$ in the system while the diaphragm is rotated to its initial reference orientation. In this way the system pressure $P_x$ becomes the reference pressure $P_o$. The output signal established at the reference orientation of the diaphragm is a baseline reference signal corresponding to a "zero" pressure reading, even though the absolute pressure is now $P_x$, not $P_o$. This additional "boot-strapping" step permits calibration over a greater pressure range. Further, the range of calibration pressures need not be limited to those gravity-induced pressures which are determinable from a given diaphragm face area density a and a given diaphragm tilt angle θ relative to the direction of local gravitational acceleration.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, wherein.

DETAILED DESCRIPTION OF THE DRAWINGS

The pressure measurement and calibration apparatus of the present invention employs a pressure sensor assembly which includes a diaphragm which is responsive to changes in pressure due to gravitational forces. The diaphragm, when tilted to different angles relative to the direction of local gravitational acceleration, experiences different gravity-induced deflections and thus can be used to determine pressures resulting from the force of gravity and to calibrate pressure measuring devices at very low pressures. Controlled flow of a fluid, such as a gas, against the diaphragm in a direction which opposes the direction of deflection can be used to eliminate the deflection due to the force of gravity. The magnitude of this fluid pressure can be computed with superior accuracy, repeatability, and traceability.

Figure 1:
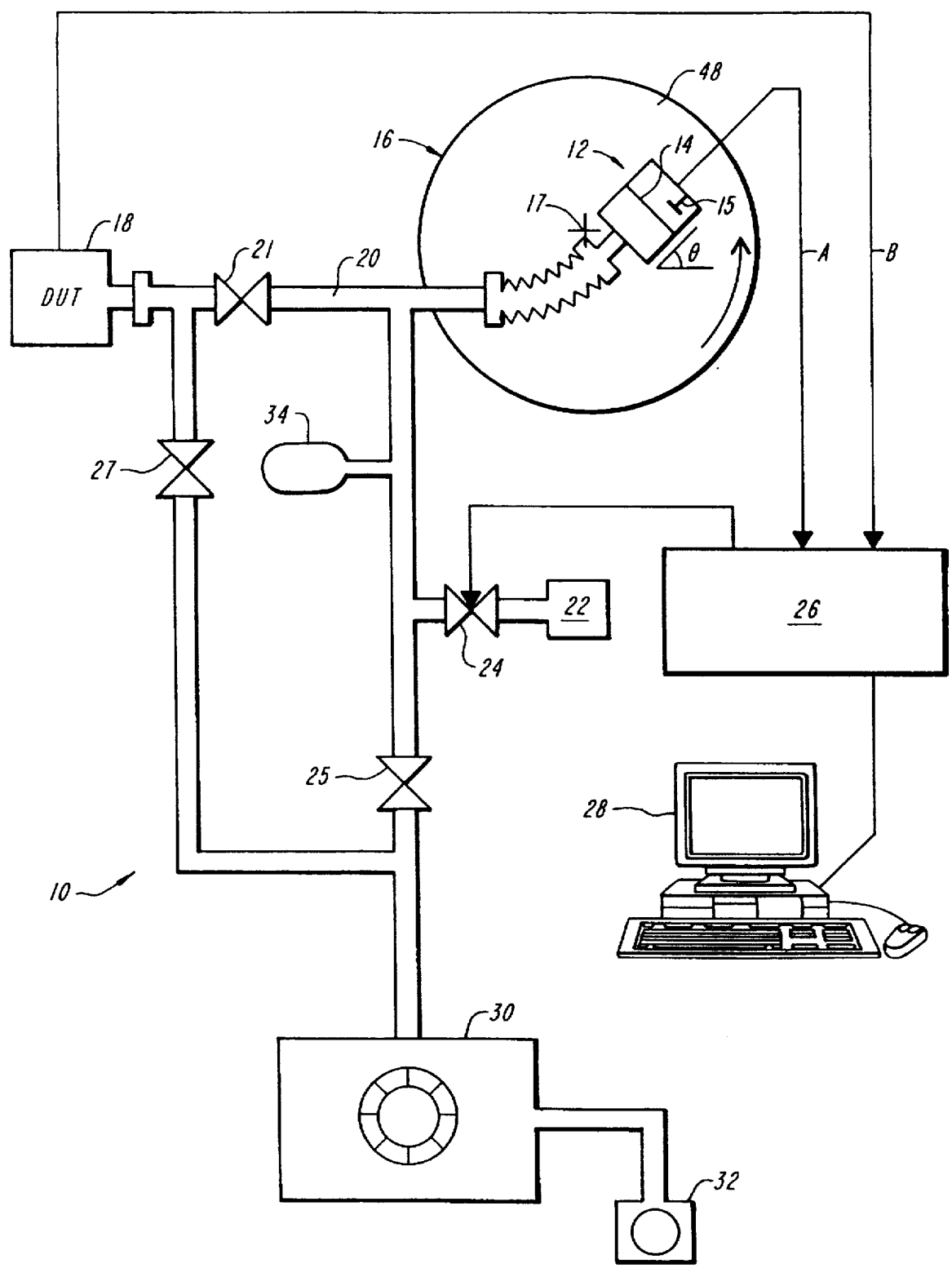
FIG. 1 is a schematic illustration of a pressure measurement and calibration apparatus according to the invention.

FIG. 1 illustrates, in schematic form, the apparatus of the present invention. The apparatus 10 comprises a pressure sensing assembly 12 which includes a deflectable diaphragm 14 and one or more detecting elements 15 for detecting the deflection of the diaphragm 14 and for generating an output signal representative of the deflection. The apparatus further includes a rotary device 16 for controllably rotating the pressure sensing assembly 12 about a reference axis (indicated at 17) which is normal to the direction of local gravitational acceleration (and normal to the plane of FIG. 1). The diaphragm 14 is coupled to an external device under test (DUT) 18 through a distribution manifold 20 and valve 21, which exposes the DUT 18 to the same pressures as the diaphragm 14. The apparatus further includes a fluid source 22 which is connected to the distribution manifold 20 via proportioning control valve 24. Controller circuit 26 and associated programming instructions or the like operated through a computer 28 or other operating system controls fluid flow from the fluid source 22 against the diaphragm 14 and to the DUT 18. Mechanical fluid pumps 30, 32 provide a dynamic low pressure (vacuum) environment for control of the fluid pressure from fluid source 22 against the diaphragm 14. Valves 25 and 27 allow for isolation of the DUT 18, diaphragm 14, and pumps 30, 32 for the purpose of independently changing the DUT, pump, or diaphragm. Ion gauge 34 is coupled between the pressure sensing assembly 12 and the fluid source 22 to ensure that the pressure is effectively zero (i.e., less than $10^{-6}$ Torr) at initiation of operation of the apparatus. Feedback loop A connects the pressure sensing assembly 12 with the controller circuit 26, and signal line B connects the DUT 18 to the controller circuit 26.

Figure 2A:
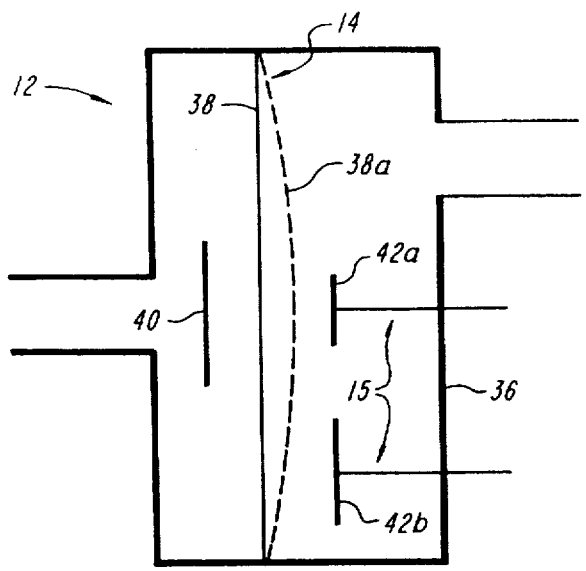
FIGS. 2A and 2B are schematic illustrations of two embodiments of the pressure sensor assembly of the present invention.
Figure 2B:
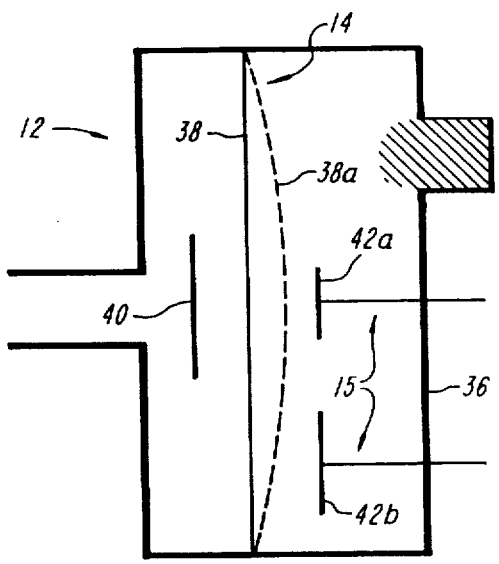

In one aspect of the invention, the diaphragm 14 and detecting elements 15 can be combined in a standard capacitance manometer, known in the art and illustrated schematically in FIGS. 2A and 2B. As previously mentioned, the capacitance manometer is not used as a primary measurement device in the apparatus of the present invention, and thus its accuracy does not affect the accuracy of measurements taken with the apparatus of the present invention. However, for best results the capacitance manometer should provide a highly stable signal at a zero reading and should have a high signal-to-noise ratio.

In a capacitance manometer, as illustrated in FIGS. 2A and 2B, a diaphragm 14, which can be a metal foil 38, is stretched in tension across a housing 36. The foil 38 is highly sensitive to differences in pressure on either side of the foil. On one side of the foil 38 is a baffle 40 which assists in distributing the medium in contact with the foil 38 uniformly over its surface. On the other side of the foil 38 is an electrode assembly 42 comprising one or more individual electrodes 42a, 42b. The foil 38 effectively forms the movable plate of a variable capacitor, and the electrodes 42a,42b form the stationary plates. The foil 38 deflects with changing pressure (force per unit area) to position 38a, shown as a dashed line in FIGS. 2A and 2B, independent of the composition of the medium in contact with it. This deflection causes a capacitance change between the foil 38 and the adjacent electrode assembly 42, and a signal is generated which is proportional to the magnitude of the deflection.

The diaphragm illustrated in FIG. 2A is typically used for differential pressure measurements. The edges of the foil 38 are usually hermetically sealed so that both sides of the foil 38 can be exposed to different fluids at different pressures. One of the fluids is often at a reference pressure. The diaphragm illustrated in FIG. 2B is typically used for absolute pressure measurements. Only one side of the foil 38 is exposed to a fluid whose pressure is to be determined. The other side of the foil 38 is sealed to establish a vacuum which is maintained with a chemical getter. The pressure of the fluid can be determined directly from the capacitance signal resulting from the deflection of the diaphragm relative to the electrodes 42a, 42b.

Figure 2C:
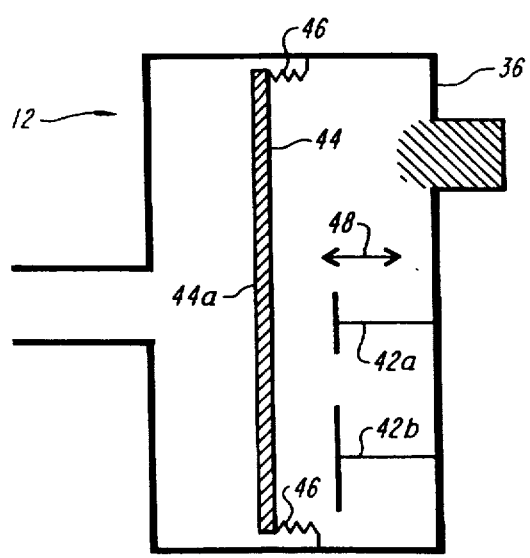
FIG. 2C is a schematic illustration of a third embodiment of the pressure sensor assembly of the present invention.

As shown schematically in FIG. 2C, the range of pressure measurements can be further increased by replacing the diaphragm foil 38 with a solid piston 44 and elastic membrane 46 which acts as a flexible spring or bellows. The piston 44 is free to move in the direction of arrow 48 in response to local gravitational forces on the piston face 44a. The elastic membrane 46 preferably has a negligible effective surface area, whereas the surface area of the piston face 44a of the piston 44 approximates that of the diaphragm which it replaces. The face area density σ of the piston 44 can be computed from its mass and its face area, both of which can be highly accurately measured with traceability to known primary standards.

Figure 3:
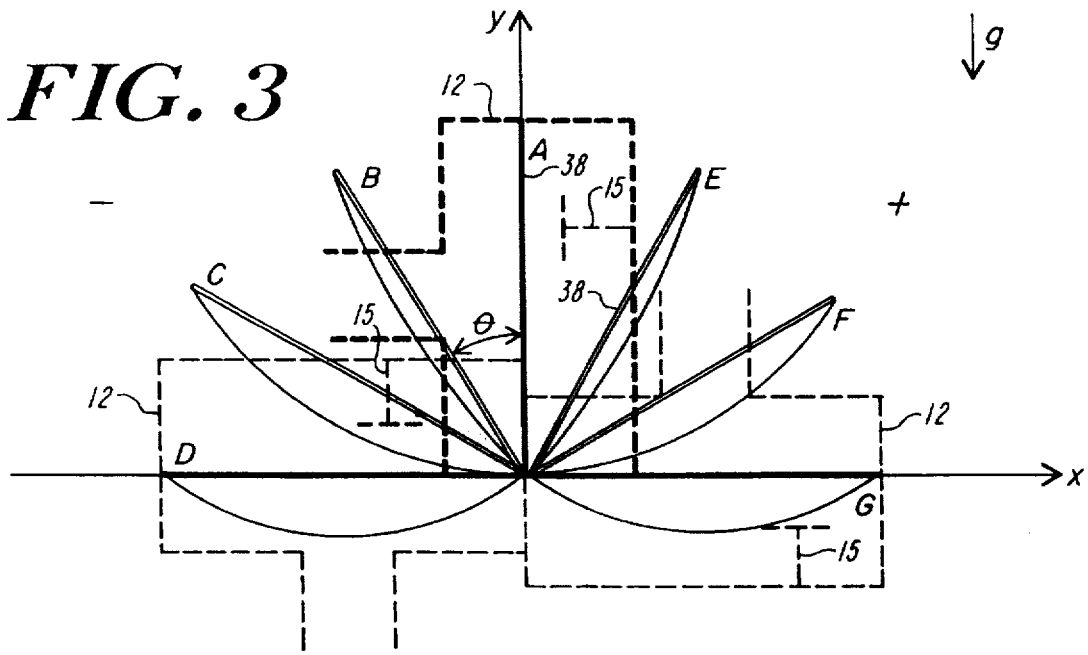
FIG. 3 is a schematic illustration of the deflection of a diaphragm with incremental changes in the angle of rotation and the corresponding pressures on the diaphragm.

FIG. 3 illustrates the effect of gravity-induced deflection of a diaphragm 14 (e.g., the foil 38 or piston 44) in response to changes in angular orientation of the diaphragm relative to a horizontal reference plane x and a vertical reference plane y. The diaphragm positions are superimposed over the sensor to indicate relative positions of the foil and electrodes for various angles. The vector of the local acceleration due to the gravitational acceleration g is designated by downward-pointing arrow g. In position A, the diaphragm is substantially parallel to the gravity vector g, i.e, vertical, and no gravity-induced deflection occurs. In position D, the diaphragm is horizontal and maximum negative deflection due to gravity away from electrode 15 is observed. In position G, the diaphragm is horizontal and maximum positive deflection due to gravity toward electrode 15 is observed. In positions B, C, E and F the diaphragm is angled to varying degrees relative to the horizontal and vertical planes x and y and exhibits varying degrees of deflection due to gravity. The deflection of the diaphragm at each angle $\theta_1$ is detected by the detecting electrodes and transmitted as a corresponding signal $S_i$.

In a preferred embodiment, the capacitance signal which corresponds to the nondeflected state of the diaphragm (position A in FIG. 3) is arbitrarily designated as a zero reading to establish a baseline reference signal $S_o$. In an alternative embodiment, the capacitance signal which corresponds to the position of maximum deflection of the diaphragm due to gravity (position D or G in FIG. 3) is arbitrarily designated as the zero reference signal.

Different diaphragm positions exhibit different deflections with corresponding capacitance signals which can be easily distinguished from the zero reading. Controlled fluid flow against the deflected diaphragm in a direction opposite to that of the deflection restores the diaphragm to its nondeflected state, as indicated by a return of the capacitance signal to its designated reference value. The pressure $P_x$ of the fluid required to do this for each angular position of the diaphragm can then be determined from the above equation.

The pressure to be determined varies with the sine of the angle of the diaphragm relative to the direction of local gravitational acceleration. Typically at least ten different angular positions for the diaphragm are used for calibration.

The range of pressures that can be measured using the apparatus can be determined at least in part by selection of an appropriate diaphragm material. A thicker and/or heavier foil has a greater face area density value a and permits measurement of greater pressures. Thus, the versatility of the apparatus of the present invention can be enhanced by selecting different diaphragm materials for pressure measurements in specified ranges.

Figure 4:
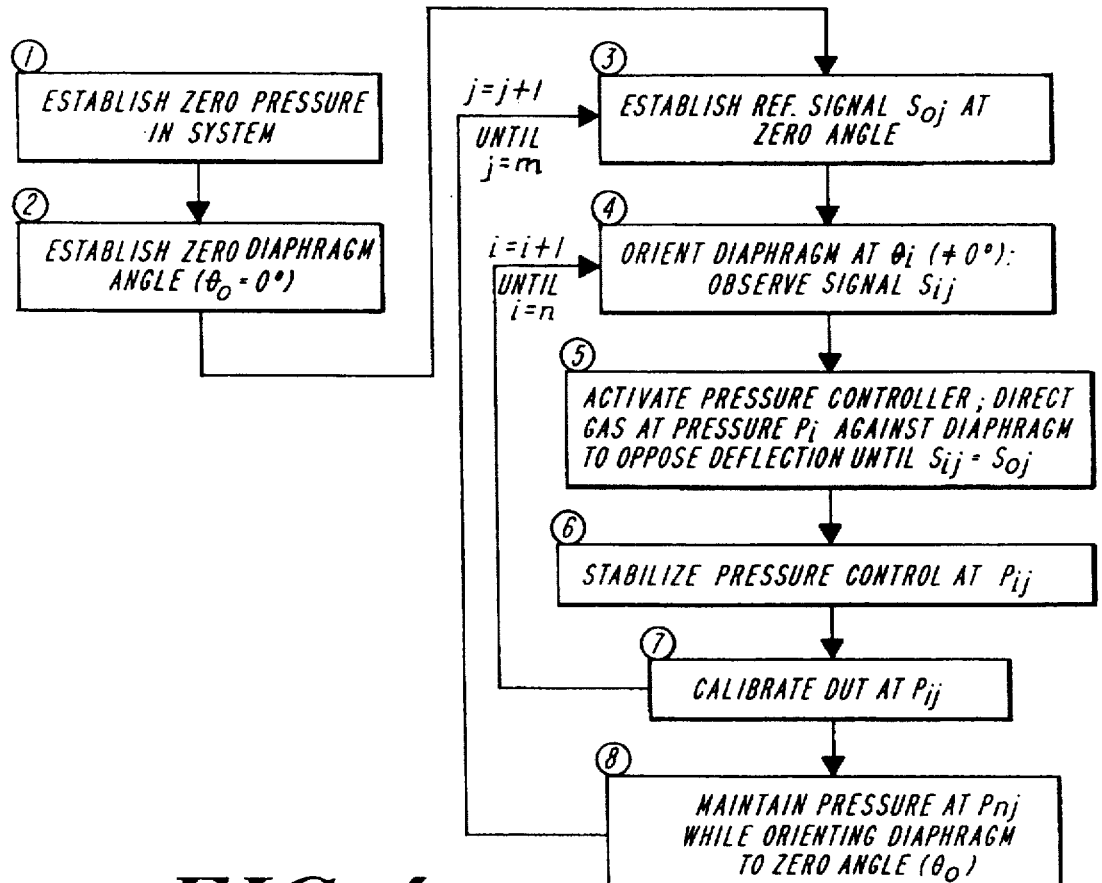
FIG. 4 is a flowchart illustrating a sequence of steps in the calibration of an external pressure measurement device using the apparatus of the present invention.

FIG. 4 is a flowchart which indicates a sequence of operations for calibrating a DUT 18 using the apparatus illustrated in FIG. 1. At initiation of calibration, vacuum pumps 30, 32 are turned on and valves 21 and 25 are opened to establish a low pressure (high vacuum) environment in the system. Proportioning control valve 24 from the fluid source 22 is then closed. The pressure sensing assembly 12, which is affixed to a rotary table 48 driven by, for example, stepper motors (not shown), is rotated to a first reference orientation $\theta_0$, wherein the angle of the diaphragm relative to the direction of local gravitational acceleration is 0 degrees and essentially no deflection of the diaphragm due to gravity occurs. A reference signal $S_0$ at this diaphragm orientation is recorded. The zero signal reading $S_0$ establishes a reference baseline value against which other signals representing other deflections at other angles can be compared.

The pressure-sensing assembly 12 is then rotated via the rotary table 48 to a first angle $\theta_1$ relative to the direction of local gravitational acceleration. The deflection of the diaphragm 14 due to gravity at the first angular orientation $\theta_1$ produces a corresponding capacitance signal $S_1$, which is recorded. The controller circuit 26 is then activated to initiate a controlled fluid flow through valve 24, such as nitrogen gas from the fluid source 22, against the diaphragm in a direction opposite to the deflection of the diaphragm to restore the capacitance signal $S_1$ to the zero reference reading $S_0$. When $S_1=S_0$, the fluid pressure $P_x$ on the diaphragm precisely offsets the gravitational pressure on the diaphragm and is designated as $P_1$. The pressure $P_1$ is allowed to stabilize, whereupon the DUT 18 can then be calibrated at the pressure $P_1$. This pressure $P_1$ can be calculated from σ, g and θ, each of which can be measured with high accuracy and traceability to known primary standards.

The pressure-sensing assembly 12 is then oriented to a second angle $\theta_2$ relative to the direction of local gravitational acceleration. The process is then repeated for any number of desired angular orientations of the diaphragm relative to the direction of local gravitational acceleration. In FIG. 4 the equation i=i+1 until i=n denotes the repetition of steps 4–7 encompassed by the inner loop for any desired number n of measurements $P_1$ at different angles $\theta_i$.

The range of pressures that can be measured using the apparatus of the invention can further be increased by the previously-mentioned "boot-strapping" technique which resets the so-called reference or baseline pressure $P_o$ to higher values. This technique is accomplished, as illustrated in FIG. 4, by reorienting the diaphragm 14 from its position at some angle $\theta_n$ to its initial reference angle $\theta_o$ while maintaining a constant pressure $P_n$ from fluid source 22. The pressure $P_n$ now becomes the reference pressure in the system at a diaphragm angle of zero degrees. Orientation of the diaphragm to a first angle $\theta_j$ causes the diaphragm to deflect by a proportional amount, and a pressure $P_j$ greater than $P_n$ can be determined as previously described. The equation j=j+1 until j=m in FIG. 4 denotes the repetition of steps 3–8 encompassed by the outer loop for any desired number m of resets of the baseline pressure $P_o$. This "boot-strapping" technique increases the dynamic measurement range of the apparatus without compromising its accuracy and thus further enhances the versatility of the apparatus.

The face area density σ of a foil such as that used as a diaphragm in a capacitance manometer, or of a piston of known mass and surface area, can be reliably measured to within 0.01%. The uncertainty of the measurement of the component of gravitational force due to the local gravitational acceleration g is negligible. The uncertainty of the angle θ can be measured to within 0.05% at an angle corresponding to 1 millitorr, and to within 0.01% at an angle corresponding to 10 millitorr. Temperature-induced uncertainty can be minimized by positioning the pressure-sensing assembly 12 at room temperature in a mounting arrangement having a large thermal mass and by locating all controlling electronics 26, 28 remotely from the pressure-sensing assembly. The total uncertainty of the pressure measurements obtainable with the apparatus and method of the invention is estimated at less than 0.1% at 1 millitorr and less than 0.05% at 10 millitorr.

The apparatus thus described provides a primary pressure standard for the calibration and measurement of gas pressures in the range of approximately 0–1000 millitorr with an uncertainty of no more than approximately 0.1%. The pressure measurement and calibration apparatus can be used to determine gas pressures in the range of approximately 0–1000 millitorr and to generate known pressures for calibrating other pressure measurement instruments. The gas pressure measurement apparatus can measure both differential and absolute pressures, is constructed so that it does not expose the gas so as to minimize contamination of the gas and is relatively simple to automate. The apparatus thus provides an easy method of measuring and calibrating gas pressures in the range of approximately 0–1000 millitorr.

Because certain changes may be made in the above apparatus without departing from the scope of the invention herein disclosed, it is intended that all matter contained in the above description or shown in the accompanying drawings shall be interpreted in an illustrative and not a limiting sense.

What is claimed is:

1. Pressure measurement and calibration apparatus, comprising:

a pressure sensing assembly, said assembly including a deflectable diaphragm and means for detecting deflection of said diaphragm and for generating an output signal representative of said deflection;

means for controllably rotating said diaphragm about an axis normal to the direction of local gravitational acceleration on said diaphragm, whereby said diaphragm is capable of deflection in response to local gravitational acceleration on said diaphragm, said deflection of said diaphragm being variable as a function of the angle between said diaphragm and said direction of local gravitational force; and means for controllably conducting a flow of a fluid against said diaphragm to substantially eliminate said deflection.

2. Apparatus according to claim 1 wherein said pressure sensing assembly comprises a capacitance manometer.

3. Apparatus according to claim 1 wherein said diaphragm comprises a metal foil.

4. Apparatus according to claim 1 wherein said diaphragm comprises a piston coupled to an elastic membrane.

5. Apparatus according to claim 1 wherein said means for rotating said diaphragm about said axis comprises a rotary device capable of rotating said diaphragm through at least 90 degrees of incremental rotation about said axis.

6. Apparatus according to claim 5 wherein said rotary device is a motor-driven rotary table to which said pressure sensing assembly is affixed.

7. Apparatus according to claim 1 wherein said fluid flow conducting means comprises a fluid source coupled to a distribution manifold.

8. Apparatus according to claim 7 further comprising isobaric coupling means for coupling said distribution manifold to at least one external device so that said external device and said diaphragm are at equal fluid pressures.

9. Apparatus according to claim 1 wherein said output signal is an electrical signal.

10. Apparatus according to claim 1 wherein said fluid is a gas.

11. A method of calibrating an external pressure measuring device at fluid pressures in the range of between approximately 0 and 1000 millitorr, comprising the steps of:

a) providing a pressure measurement and calibration apparatus comprising a pressure sensing assembly, said assembly including a deflectable diaphragm and means for detecting deflection of said diaphragm and for generating an output signal representative of said deflection, means for controllably rotating said diaphragm about an axis normal to the direction of local gravitational acceleration on said diaphragm, whereby said diaphragm is capable of deflection in response to local gravitational acceleration on said diaphragm, said deflection of said diaphragm being variable as a function of an angle θ between said diaphragm and said direction of local gravitational acceleration, and means for controllably conducting a flow of a fluid against said diaphragm to substantially eliminate said deflection;

b) orienting said diaphragm to a reference orientation and establishing an output signal representative of said reference orientation of said diaphragm;

c) rotating said diaphragm about said axis through a preselected angular increment relative to said reference orientation to establish a gravity-induced deflection of said diaphragm at a corresponding first angular position of said diaphragm;

d) detecting said deflection of said diaphragm and generating an output signal representative of said deflection;

e) controllably conducting a flow of a fluid against said diaphragm to substantially eliminate said deflection of said diaphragm;

f) permitting said fluid flow to stabilize against said diaphragm at a pressure $P_x$;

g) exposing said external pressure measuring device to said fluid flow at said pressure $P_x$ through isobaric coupling means disposed between said diaphragm and said external pressure measuring device; and h) calibrating said external pressure measuring device at said pressure $P_x$.

12. The method of claim 11 further comprising the step of:

(i) computing the value of said pressure $P_x$ from the formula $P_x = \sigma g \sin\theta$, wherein σ is the face area density of said diaphragm, g is the local gravitational acceleration on said diaphragm, and θ is the angle of said diaphragm relative to said reference orientation.

13. The method of claim 12 further comprising the step of:

(j) repeating steps (c) through (i) for different angular orientations of said diaphragm relative to said reference orientation.

14. The method of claim 11 wherein said output signal is restored to said reference value when said fluid flow substantially eliminates said deflection of said diaphragm.

15. The method of claim 11 wherein said reference orientation is substantially parallel to the direction of local gravitational acceleration and said output signal reference value associated with said reference orientation of said diaphragm is representative of substantially zero gravity-induced deflection of said diaphragm.

16. The method of claim 11 further comprising the steps of:

(k) maintaining said fluid flow at said pressure $P_x$;

(l) orienting said diaphragm to said reference orientation; and (m) repeating steps (b)–(h) for different angular orientations of said diaphragm relative to said reference orientation.

* * * * *

UNITED STATES PATENT AND TRADEMARK OFFICE
CERTIFICATE OF CORRECTION

PATENT NO. : 5,515,711
DATED : May 14, 1996
INVENTOR(S) : Luke D. Hinkle

It is certified that error appears in the above-indentified patent and that said Letters Patent is hereby corrected as shown below:

column 6, line 4, delete "Mechanical fluid pumps 30, 32" and substitute therefor --Turbo-powered fluid pump 30 and mechanical fluid pump 32--;

Claim 16, column 10, line 63, delete "(b)" and substitute therefor --(c)--.

Signed and Sealed this

Twentieth Day of August, 1996

Attest:

BRUCE LEHMAN

Attesting Officer      Commissioner of Patents and Trademarks